May 14, 1940.   T. A. STEHLIN   2,200,659
VEHICLE WHEEL BRAKE CONTROL
Filed Oct. 5, 1936   6 Sheets-Sheet 1

INVENTOR.
THEODORE A. STEHLIN.
BY
ATTORNEY

May 14, 1940.   T. A. STEHLIN   2,200,659
VEHICLE WHEEL BRAKE CONTROL
Filed Oct. 5, 1936   6 Sheets-Sheet 2

INVENTOR.
THEODORE A. STEHLIN.
BY *William E. Hall*
ATTORNEY

INVENTOR.
THEODORE A. STEHLIN
BY
ATTORNEY

INVENTOR.
THEODORE A. STEHLIN.
BY *William E. Hall*
ATTORNEY

Patented May 14, 1940

2,200,659

UNITED STATES PATENT OFFICE 2,200,659

VEHICLE WHEEL BRAKE CONTROL

Theodore A. Stehlin, San Diego, Calif., assignor to T. Clifford Melim, Honolulu, Territory of Hawaii Application October 5, 1936, Serial No. 104,071

12 Claims. (Cl. 188—3)

My invention relates to brake mechanisms for vehicle wheels and refers particularly to a novelly controlled system for such brake mechanisms.

It is a general object of this invention to provide a novelly controlled system for brake mechanisms of vehicles of the fluid pressure type, and particularly vacuum type brakes, or a combination of mechanical and vacuum operated brakes.

An important object of this invention is to provide a brake mechanism or apparatus whereby the brakes of either a light or a very heavy vehicle or a train of vehicles may be easily applied by any driver irrespective of the strength of the driver or the force applied by the driver, and further whereby the brakes may be applied suddenly or gradually as desired.

Another object of this invention is to provide an apparatus whereby the brakes of the vehicle may be applied very uniformly, thus avoiding unequal brake application and consequent skidding, and further avoiding unequal wear of the tires and of the brake mechanism.

An important object also of this invention is the provision of an apparatus whereby the brakes cannot be applied instantly, thus avoiding sudden shocks or jolts, but in which the brakes are applied at predetermined speed dependent, however, upon the speed of depression or manipulation of a manually controlled lever or pedal.

An important object also is the provision of a brake controlling means which is particularly simple and economical of construction and which will not readily deteriorate or get out of order.

An important object of the invention also is the provision of an apparatus of this class which is particularly adapted for applying the brakes on a train of vehicles, such as a tractor and one or more trailers.

A further object of this invention is to provide such an apparatus in which the brakes on the tractor and trailer or trailers may be selectively applied, so that the brakes of the trailers may be applied at varying times before the brakes of the tractor or leading vehicle are applied.

An important object also is the provision of an apparatus of this class which is so constructed that if the trailer or hitch becomes unfastened, the fluid pressure connecting means are readily separated, the fluid pressure lines are automatically shut off, and the trailer brake automatically applied.

Another object is to provide an apparatus of this class which as a whole is simple and economical of construction, of operation, and installation.

With these and other objects in view as will appear hereinafter, I have devised a brake apparatus of this class having certain novel features of construction, combination, and arrangement of parts and portions, as will hereinafter be described in detail and particularly set forth in the appended claims, reference being had to the accompanying drawings and to the characters of reference thereon, which form a part of this application, in which:

Figure 1:
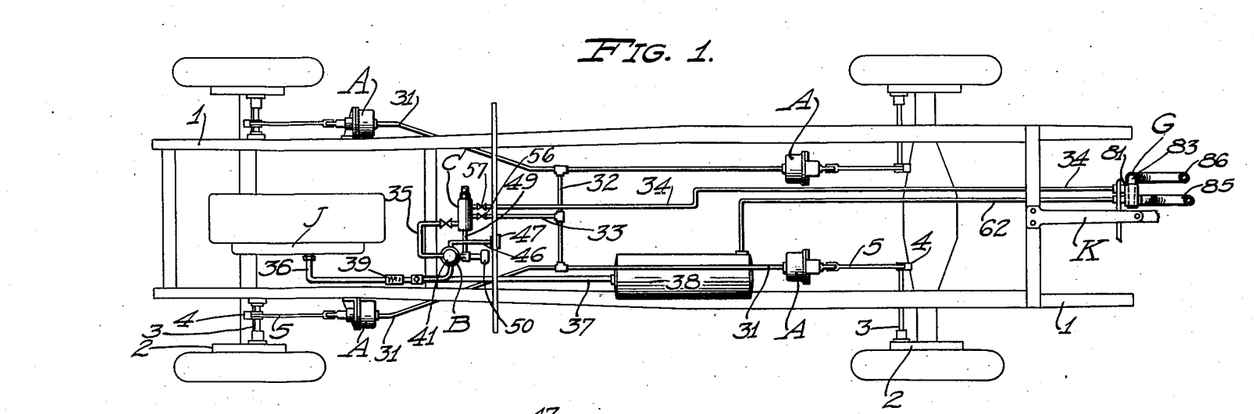
Fig. 1 is a diagrammatic view in plan showing the installation of my brake apparatus in one form on a conventional automobile.
Figure 2:
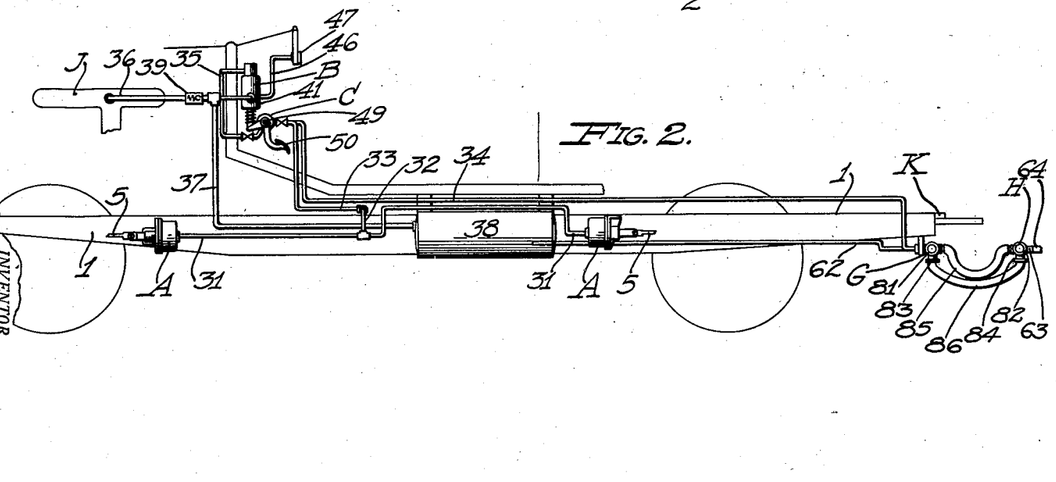
Fig. 2 is a side elevational view thereof.

In Figs. 1 and 2, the chassis 1 of the vehicle, automobile, or tractor, the brake drums 2, the brake shafts 3, crank arms 4, and brake rods 5 are of conventional construction and in common use, and need not further be described.

On the leading vehicle or tractor are mounted brake cylinders A, one for each wheel, which are controlled by a manual control valve B, controlled from the driver's compartment of the leading vehicle or tractor. On this vehicle is also mounted the selector valve C for selectively directing the fluid pressure to the brakes of the leading vehicle and the following vehicle or vehicles.

If the brake apparatus is used on a single vehicle, the identical elements, referred to above are employed, with the exception of the selector valve C.

Figure 3:
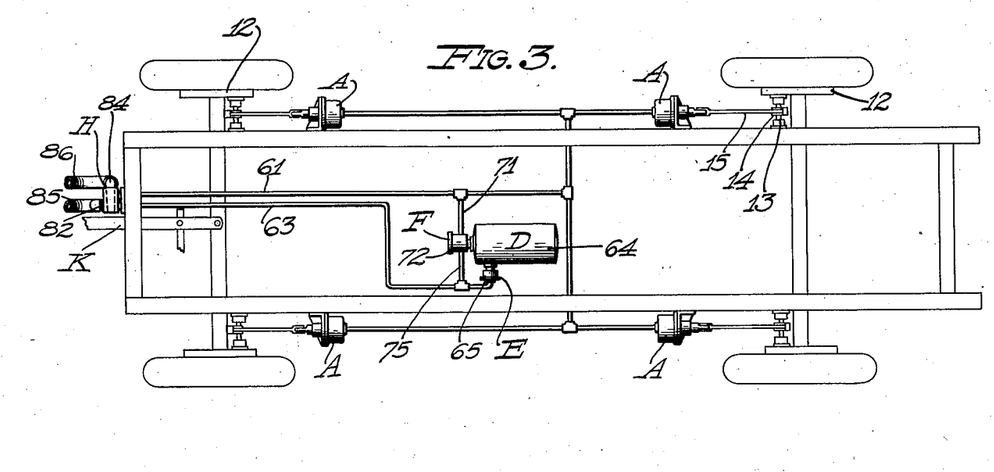
Fig. 3 is a diagrammatic view in plan showing my brake apparatus in one form applied to a trailer, and showing fragmentary means for connecting the trailer frame to a tractor or leading vehicle.
Figure 4:
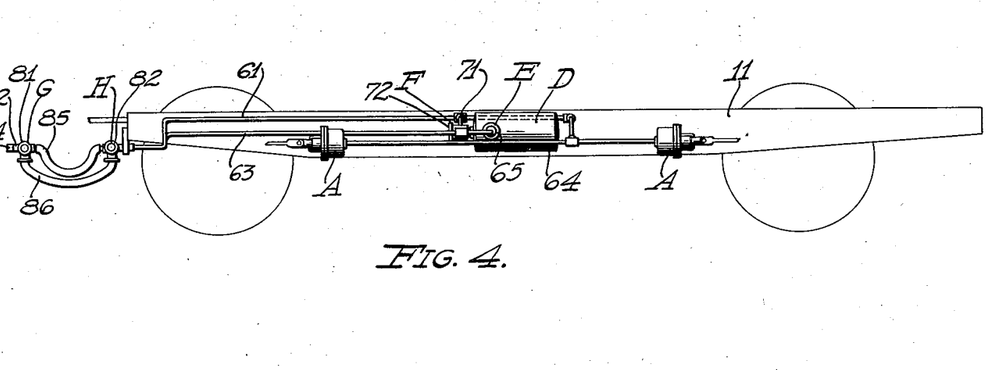
Fig. 4 is a side elevational view thereof.

The trailer is designated by the chassis 11. The wheels of the trailer are provided with brake drums 12, brake shafts 13, crank arms 14, and brake rods 15. On the trailer chassis are also mounted brake cylinders A, one for each wheel. The brake cylinders A on the trailer are controlled thru the manual control valve B and the selector valve C on the main vehicle. On the trailer are also mounted an emergency tank D, a check valve E and an emergency valve F. The fluid pressure lines and the brake lines of the leading and following vehicles are connected by special devices consisting essentially of couplings G and H. All these valves, devices and mechanisms will be described in detail hereinafter.

Although I have referred to a fluid pressure brake apparatus, I will refer hereinafter to a particular embodiment thereof, namely a vacuum brake apparatus. But the reference to fluid pressure is intended to include vacuum, and vacuum means to be a specific form of fluid pressure means.

Figure 10:
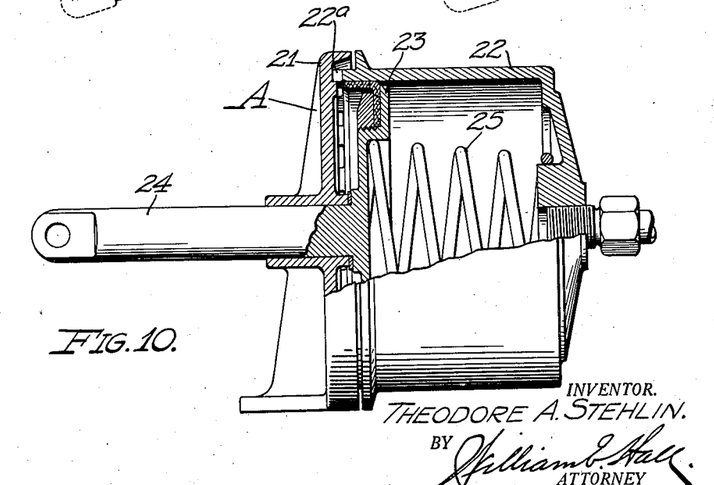
Fig. 10 is an enlarged longitudinal section of a single brake cylinder for applying the brakes of each wheel.
Figures 11, 12, 13, 14:
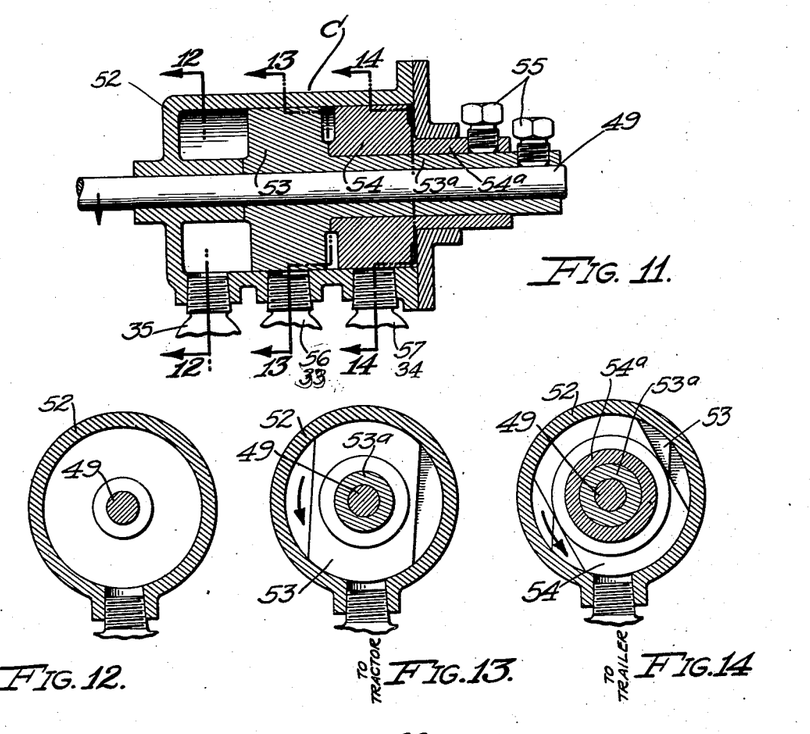
Fig. 11 is a longitudinal section of the selector valve, for regulating the time of the application of the brakes of the connected vehicles.
Figs. 12, 13, and 14 are transverse sectional views taken respectively thru 12—12, 13—13 and 14—14 of Fig. 11.

The brake cylinders A, for applying the brakes of each of the wheels, consist essentially of cylinder or casing members 21 and 22, a piston 23, reciprocally mounted in the cylinder member 22, and a piston rod 24, secured to the piston and extending therefrom and axially through the casing member 21 and pivotally connected, through the brake rod 5, to the free end of the crank arm 4 of the brake which it is to control. A compression spring 25 is placed within the cylinder and against the piston for urging the piston rod 24 from the cylinder. The casing member 22 is cylindrical and provided with a head at one end. The opposite or open end of this casing member is secured to the casing member 21 which provides the other head and also the bracket for supporting the brake cylinder on the chassis of either tractor or trailer. At the joint between the casing members 21 and 22 are provided circuitous vent openings 22ª to permit the free passage of air when the piston reciprocated.

This brake cylinder, as well as multiple units thereof, is disclosed and claimed in a copending application.

The front and rear brake cylinders at each side of the vehicle chassis are connected together by pipes 31, these pipes being connected to the axial portions of the casing members 22. The intermediate portions of the pipes 31 are connected by a transverse pipe 32, which in turn is connected intermediate its ends, by a pipe 33, to the selector valve C. The aforementioned brake cylinders and connections are duplicated on all vehicles. In this instance the brake line of the trailer or following vehicle is shown connected to the selector valve C by a pipe 34. The selector valve is connected, by a pipe 35, to the manual control valve B which is connected, by pipes 36 and 37, to sources of fluid pressure, or, in this instance, to vacuum sources. The pipe 36 is connected to the intake manifold J of the engine propelling the vehicle, while pipe 37 is connected to a vacuum storage tank 38 mounted on the vehicle. These pipes 36 and 37 are connected together and are then connected to the control valve B by a single pipe. In the pipe 36 is provided a check valve 39, of conventional construction, which permits the intake manifold of the engine to create a vacuum in both the manual control valve B and in the tank 38. When the engine is not operated, the manual control valve C is connected to draw directly upon the supply tank 38 as the source vacuum.

Figures 5, 6, 7:
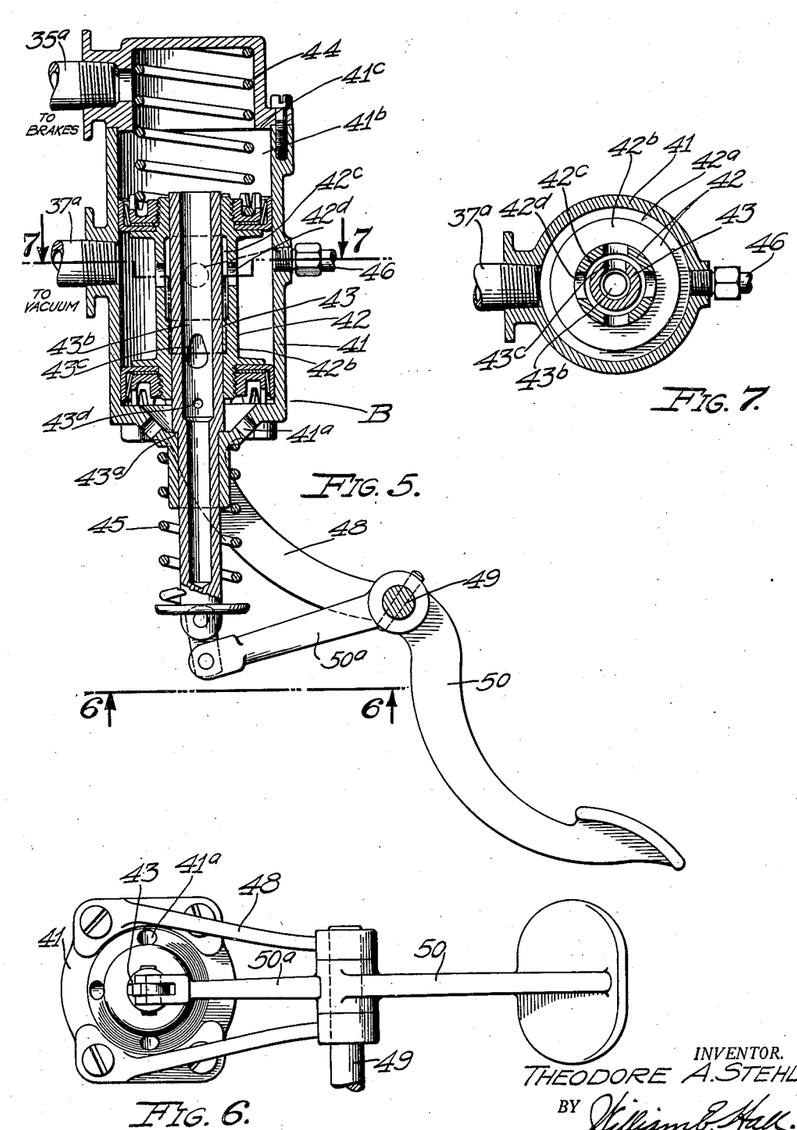
Fig. 5 is an enlarged elevational view, partly in section, of the control valve and operating lever or pedal.
Fig. 6 is a fragmentary bottom end view thereof.
Fig. 7 is a transverse sectional view thereof taken through 7—7 of Fig. 5.

The valve B consists essentially of a cylindrical casing 41 in which is reciprocally mounted a double or opposed piston 42, a plunger 43 coaxially and reciprocally mounted with respect to the casing and the piston, and springs 44 and 45 in association respectively with the piston and the plunger for urging both in the same direction toward one end of the casing. The casing is cylindrical and preferably positioned vertically with the upper end provided with a fitting 35ª connected to the brakes through the pipe 35, and provided intermediate its ends with a fitting 37ª connected to the vacuum sources through pipes 36 and 37. The casing is also provided with a pipe connection 46 intermediate its ends, which pipe extends to a pressure gage 47 preferably located on the instrument board of the vehicle, for indicating to the driver the fluid pressure or the vacuum in the portion of the casing connection to the vacuum sources, that is, the pressure of the fluid source which is to actuate the brakes.

The piston 42 is in the form of a spool having cup leathers 42ª at its opposite ends, forming an annular channel 42ᵇ intermediate its ends, which annular channel is at all times connected to the pipes 37 and 46, or to the vacuum sources and the gage. The piston is urged toward the lower end of the cylindrical casing by the compression spring 44. The plunger 43 is provided with a shoulder 43ª intermediate its end, which shoulder is forced against the lower end of the cylindrical casing, as a stop, by the compression spring 45 positioned outside of the casing between the casing and the lower end of the plunger. The upper end of the plunger has a central bore 43ᵇ, the upper end of which communicates at all times with the upper end of the casing, and therefore with the pipe 35 leading to the brakes.

The bore of the piston, through which the plunger extends, is undercut intermediate its ends, forming an annular chamber 42ᶜ which communicates through a port 42ᵈ, with the large annular channel 42ᵇ. This port 42ᵈ is preferably located nearer the upper end of the annular channel 42ᵇ than the lower end. In the wall of the plunger is provided a port 43ᶜ which, when the plunger is in its lowest position, is positioned below the annular chamber 42ᶜ, and which, when the plunger is shifted to its uppermost position, is never positioned above annular chamber 42ᶜ. The port 43ᶜ is peculiarly shaped, and has been found by experiment to be made preferably as shown, namely, substantially oval in shape with the larger portion positioned below. The wall of the plunger is also provided with a port 43ᵈ which is positioned immediately below the lower end of the spool or piston. The lower end of the casing 41 is also provided with a port 41ª which, when the plunger is in its lowermost or inoperative position, connects the atmosphere, through the plunger and the pipe 35 with the brakes and thus neutralizes any action upon the brakes.

A pair of brackets or arms 48 depend from the lower end of the casing 41 and extend preferably to the front side. On the lower end of these arms is mounted a rock shaft 49 on which is mounted and non-rotatably secured a foot pedal 50 having a backwardly extending arm 50ᵃ, the free end of which is pivotally connected, by a link, with the lower end of the plunger 43.

Figure 8:
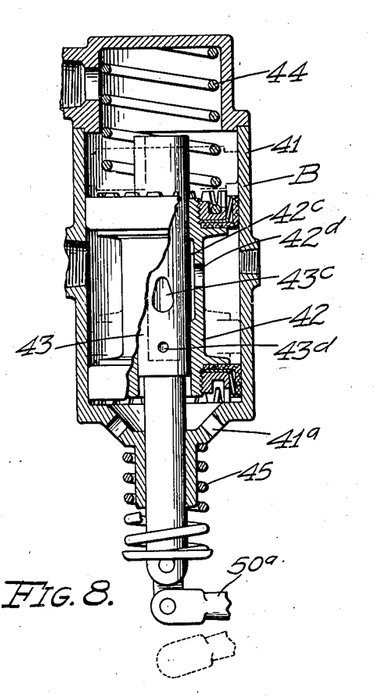
Fig. 8 is a diagrammatic view showing the operating plunger of the control valve partly depressed or forced into the valve.
Figure 9:
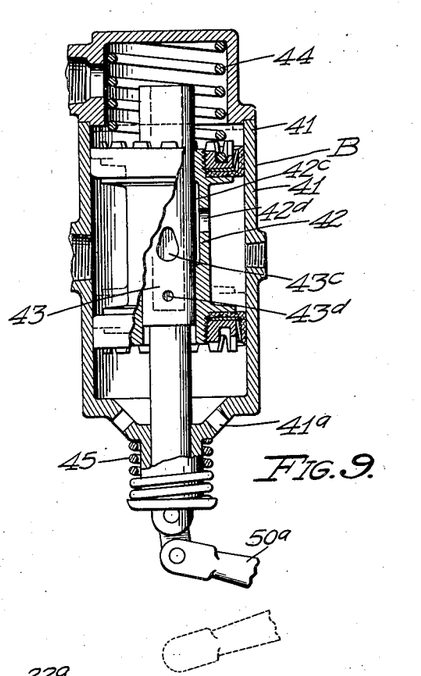
Fig. 9 is a similar diagrammatic view thereof showing the plunger wholly depressed.

In order to apply the brakes, the foot pedal 50 is depressed which raises the plunger. (See Fig. 8.) Immediately the port 43ᵈ is closed, shutting off atmospheric pressure from the brakes. As the plunger is raised slightly more, the small portion of the port 43ᶜ connects with the lower end of the annular chamber 42ᶜ which is connected at all times with the source of the vacuum. A partial vacuum is immediately created in the brake line, which includes the upper portion 41ᵇ of the casing 41. Such partial vacuum immediately acts upon the piston 42 and tends to draw the piston upwardly against the compression of the spring 44, and tends to close the port 43ᶜ. If the plunger is raised no further, the action upon the brakes and the raising of the piston 42 is equalized. Consequently there is only slight movements of or application of the brakes. As the plunger is raised further, the foregoing action is repeated until the plunger is forced to the upper end of its stroke. (See Fig. 9.) The upward movement of the piston is limited by a shoulder 41ᶜ at the upper end of the casing 41. Thus it is seen that the port 43ᶜ, nor any portion thereof, is closed by the piston 42 while the plunger is raised. Therefore, the full fluid or vacuum pressure is applied to the brakes. The relative positions of the plunger and piston are shown in Fig. 8. The dotted line position of the piston shows the extreme upper position thereof when the plunger is shifted to the position shown. Rapid upward shifting of the plunger will be proportionably equalized by upward drawing of the piston. If the plunger is instantly forced its full distance upwardly full vacuum pressure is applied to the brakes. The rapidity of the brake action or application is controlled by the sizes and number of ports for communication of the vacuum or other fluid pressure.

The selector valve, shown in Figs. 11, 12, 13, and 14, consists of a cylindrical casing 52, a spindle mounted therein, and segmental valve members 53 and 54 adjustably secured to the spindle. The spindle in this instance is identical with the rock shaft 49 upon which the foot pedal 50 is mounted. Thus the selector valve is operated simultaneously with the manual control valve B for brake applications for all vehicles. One end of the casing is connected, by the pipe 35, to the upper end of the control valve. The pipes 33 and 34 are connected respectively to the middle portion of the casing and the opposite end of the casing 52. The valves 53 and 54 are mounted on the shaft 49 so as variously to cover the passages to the pipes 33 and 34. These valves are so arranged that, upon rotation of the shaft 49 by depressing the pedal 50, the valve 54 uncovers the passage to the pipe 34 before the valve 53 uncovers the pipe 33. These valve members are adjustably secured to the shaft 49 by screws 55, or the like. In the pipes 33 and 34 are positioned cocks 56 and 57, respectively, for shutting off the vacuum or fluid pressure to the tractor or trailer brakes, as desired.

Figure 15:
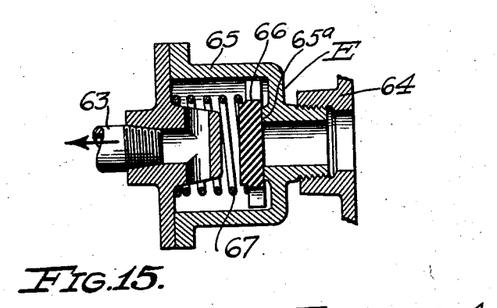
Fig. 15 is an enlarged longitudinal section of the fluid pressure check valve for the trailer.

In the ordinary operation of my brake apparatus, the brakes on the tractor and trailer, or trailers, are applied or manipulated by the control valve B on the tractor or leading vehicle. However, should the connected vehicles become disconnected accidentally or otherwise, provision is made for automatically applying the brakes on the trailer or trailers. When the tractor and trailer are connected by any suitable tractor and trailer hitch K, the train line or brake line 34 is connected with a brake line 61 on the trailer, and the vacuum tank 38, or tank line 37, is connected by a pipe 62 on the tractor with a pipe 63 on the trailer, which latter pipe is connected to a vacuum tank 64, hereinbefore referred to as tank D, on the trailer. When these vehicles are separated by accident, or otherwise, the continuity of the aforementioned pipes is broken by the separable couplings G and H, which will be hereinafter described. When said pipes or lines are broken, the forward end of the pipe 61 is automatically closed, but the forward end of the pipe 63 is open to the atmosphere. In the pipe 63, before its connection with the vacuum tank 64, there is provided the check valve E. This check valve consists of a casing 65 having a valve seat 65ᵃ, a disc valve 66 adapted to engage said seat, and a compression spring 67 adapted to force said valve against its seat. When the vacuum tanks are connected, that is, when the line is not broken, the valve 66 is drawn or separated from its seat by the vacuum, creating a vacuum in the tank 64. If the line 63 is subjected to atmospheric pressure, the valve 66 is seated and the corresponding connection with the tank 64 is closed.

Figure 16:
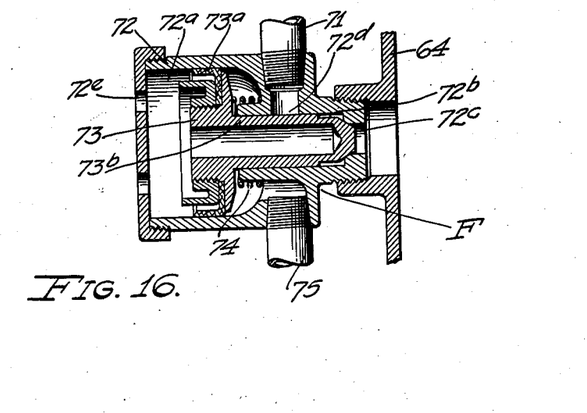
Fig. 16 is an enlarged longitudinal section of the emergency valve.

The vacuum tank 64 is provided with the emergency valve F, which controls the vacuum from said tank, thru a pipe 71, to the trailer brake line 61. This emergency valve consists essentially of a casing 72, a piston valve 73, and a compression spring 74. The piston portion 73ᵃ of the piston valve is reciprocally mounted in a cylindrical portion 72ᵃ of the casing 72, and is provided with a concentric reduced shank 73ᵇ which is reciprocally mounted in a bore 72ᵇ concentric with the cylindrical portion 72ᵃ. The end of the bore is connected thru a port 72ᶜ with the tank 64, and the side of the bore is connected by a passage 72ᵈ with the pipe 71 and the trailer brakes. The head of the casing 72, opposite the bore 72ᵇ, is provided with opening 72ᵉ connected to the atmosphere. The spring 74 is positioned within the casing and tends to urge the piston portion of the piston valve towards the head having the openings, and to draw the shank 73ᵇ from the seat covering the port 72ᶜ, and also to uncover the passage 72ᵈ, so that there is free passage between the tank and the pipe 71, to apply the brakes on the trailer. However the casing 72 is further connected by a pipe 75 with the pipe 63, so that normally when the vehicles are connected and there is vacuum in the line 63, a vacuum force will be exerted against the back of the piston portion of the piston valve, causing it to compress the spring 74 and to close the passage between the tank 64 and the pipe 71. As soon as the pipe 63 becomes disconnected from the tractor or leading vehicle, atmosphere rushes into the pipe 75, into the casing, allowing the spring 74 to be expanded and to overcome the vacuum force holding the piston valve in the position shown, and allowing the tank 64 to be connected to the pipe 71, and therefore the brakes of the trailer to be applied.

Figure 17:
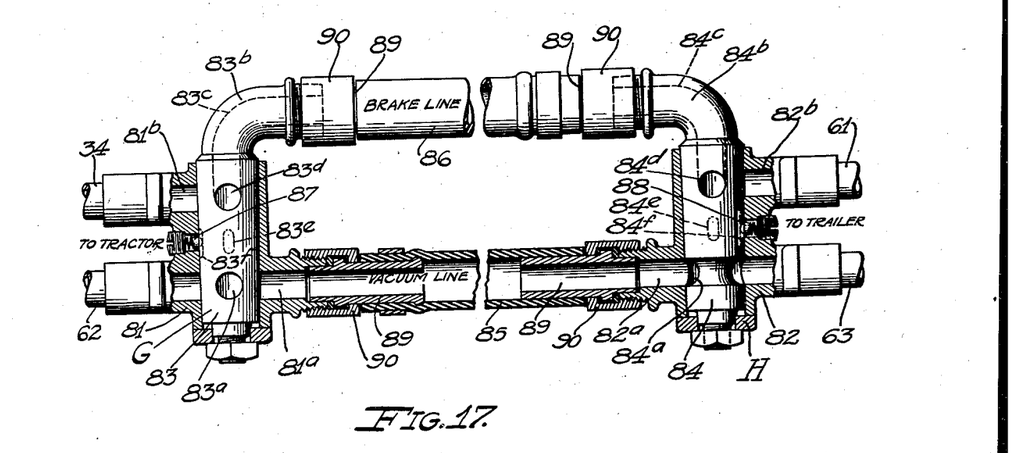
Fig. 17 is a fragmentary sectional view in plan showing the coupling means on the tractor and trailer for connecting the brake and fluid pressure means to the two vehicles.

The separable coupling means, which permits the performance of the above functions, consists essentially of a pair of coupling casings 81 and 82 mounted respectively on the rear end of the tractor and the front end of the trailer, plug type valves 83 and 84 rotatably mounted respectively in the casings 81 and 82, a hose 85 connecting the two coupling casings, and a hose 86 connecting the outer ends of the valves 83 and 84. The ends of the coupling casings, opposite the connected ends of the valves, are provided with transverse passages 81ª and 82ª respectively. The passage 81ª is connected to the pipe 62, and detachably connected at the opposite end, by means of the hose 85, to one end of the passage 82ª. The opposite end of the passage 82ª is connected to the pipe 63. The valve 83 is provided with a transverse passage 83ª which, when the apparatus is functioning normally, connects the two portions of the passage 81ª in the coupling casing 81. The valve 84 is provided with an annular channel 84ª which at all times connects the two portions of the transverse passage 82ª. The end portions 83ª and 84ª, connected by the hose 85, are bent at a right angle to the rotating axis of the valves 83 and 84. These bent or right angle portions are provided with axial passages 83ᶜ and 84ᶜ, connected at their outer ends by the hose 86, and which are provided at their inner ends with side outlets 83ᵈ and 84ᵈ which are adapted to register with transverse passages 81ᵇ and 82ᵇ in the coupling casings 81 and 82 respectively, and connected to the pipes 34 and 61. When the apparatus is functioning normally, that is, when the pipe 34 is connected to the pipe 61 and the pipe 62 connected to the pipe 63, the bent or right-angle portions are directed downwardly. Such normal operating position of the couplings is insured by spring actuated plungers 87 and 88 which are forced into recesses 83ᵉ and 83ᶠ, in the valve 83, and into recesses 84ᵉ and 84ᶠ in the valve 84.

The operation of the separable coupling means is briefly as follows:

When the vehicles are connected, the bent or right-angle portions 83ᵇ and 84ᵇ of the valves are directed downwardly, with the hose sections 85 and 86 depending downwardly in curved form, as shown in Figs. 2 and 4, providing direct passage from the pipe 62 to the pipe 63, and from the pipe 34 to the pipe 61. If the hitch K becomes disconnected, tension will be exerted on the hose sections 85 and 86, and continued separation of the vehicles will cause the hose connections to break. As soon as tension is exerted upon the hose 86, the valves will be rotated, as shown in Fig. 17, with the bent or right-angle portions directed towards each other. This will cause the passages 81ª and 81ᵇ in the coupling G, and 82ᵇ in the coupling H, to be closed. Since the valve 84 is provided with the annular channel 84ª, the passage 82ª will not be closed, but will allow atmospheric pressure in the pipe 63 to permit the performance of the aforementioned functions relative to the application of the trailer brakes. The spring actuated plungers 87 and 88 will also hold the valves in the last mentioned closed positions.

One end or the other of each hose section will be easily disconnected from the aforementioned couplings by reason of the frictional slip connections. To the free ends of the valves 83 and 84, as well as to the outer ends of the portions containing the passages 81ª and 82ª are secured hose coupling nipples 89, by means of nuts 90. The ends of the hose sections are secured to these nipples, and preferably only one end of each hose is only frictionally retained on one of the connecting nipples.

Though I have shown and described a particular construction, combination and arrangement of parts and portions, and certain applications thereof, and have referred particularly to a vacuum control system, I do not wish to be limited to these, but desire to include in the scope of my invention the construction, combination and arrangement substantially as set forth in the appended claims.

I claim:

1. In a brake apparatus for connected vehicles, a source of fluid pressure on the leading vehicle, wheel brakes on each vehicle, a manual pressure equalizer control valve connected to the fluid pressure source, and an automatic preselector valve between the control valve and the brakes of the vehicles for selectively connecting the source of fluid pressure to the brakes of the several vehicles in predetermined order when the control valve is operated.

2. In a brake apparatus for connected vehicles, a source of fluid pressure on the leading vehicle, wheel brakes on each vehicle, a manual pressure equalizer control valve connected to the fluid pressure source, and an automatic preselector valve between the control valve and the brakes of the vehicles, the preselector valve being operatively connected to and operated by the movement of the control valve, for selectively connecting the source of fluid pressure to the brakes of the several vehicles in predetermined order when the control valve is operated.

3. In a brake apparatus for connected vehicles, a source of fluid pressure on the leading vehicle, wheel brakes on each vehicle, a manual control valve connected to the fluid pressure source, and an automatic preselector valve between the control valve and the brakes for selectively connecting the source of fluid pressure to the brakes of the several vehicles in predetermined order, said manual control valve comprising a casing connected to said fluid pressure source and to said preselector valve, a plunger reciprocally mounted in the casing, a piston also reciprocally mounted in the casing, separate springs urging the plunger and the piston to one end of the casing tending to close the connections between the fluid pressure source and the preselector valve, a lever for manually shifting the plunger against the action of its spring, the depression of the plunger against its spring connecting the connections between the fluid pressure source and the preselector valve and adapted proportionally to force the piston to compress its spring and partially to reduce the connection made by the plunger.

4. In a brake apparatus for connected vehicles, a source of fluid pressure on the leading vehicle, wheel brakes on each vehicle, a manual control valve connected to the fluid pressure source, and an automatic preselector valve between the control valve and the brakes for selectively connecting the source of fluid pressure to the brakes of the several vehicles in predetermined order, said manual control valve comprising a casing having one end connected to the preselector valve and the side connected to said fluid pressure source, and having a passage adapted to connect said connections, a piston movably mounted in the casing, and having a side passage registering with the side connection of the casing and the axial portion adapted to be connected with the end connection of the casing leading to the preselector valve, a spring adapted to force the piston towards said one end of the casing, a plunger movably mounted in the piston and intersecting said passage and having a port adapted to register with the piston passage, means for urging the plunger in the same direction as the piston is urged by its spring, and manual means for shifting the plunger, the shifting of the plunger proportionably urging the piston to compress its spring and thereby partially to reduce the port opening of the plunger.

5. In a brake apparatus for connected vehicles, a source of fluid pressure on the leading vehicle, wheel brakes on each vehicle, a manual control valve connected to the fluid pressure source, and an automatic preselector valve between the control valve and the brakes for selectively connecting the source of fluid pressure to the brakes of the several vehicles in predetermined order when the control valve is operated, said preselector valve comprising a casing connected to the manual control valve and also to the brakes of the leading and following vehicle, a rotatable spindle in the casing, and separate valve members adjustably secured to said spindle for controlling the outlets to the brakes of the leading and following vehicle.

6. In a brake apparatus for connected vehicles, a source of fluid pressure on the leading vehicle, wheel brakes on each vehicle, a manual control valve connected to the fluid pressure source, and an automatic preselector valve between the control valve and the brakes for selectively connecting the source of fluid pressure to the brakes of the several vehicles in predetermined order when the control valve is operated, said preselector valve comprising a casing connected to the manual control valve and also to the brakes of the leading and following vehicle, a rotatable spindle in the casing, and separate valve members adjustably secured to said spindle for controlling the outlets to the brakes of the leading and following vehicle, said spindle being operatively connected to and adapted to be operated with said manual control valve.

7. In a brake apparatus of the class described for connected vehicles, the combination with vacuum sources on the leading vehicle and on the following vehicle, brakes on both vehicles, means on the leading vehicle for controlling the brakes on both vehicles, and means on the following vehicle for emergency application of the brakes on the following vehicle, of a coupling on one of the vehicles, comprising a casing having a passage for connecting the vacuum source on the leading vehicle to the brakes on the following vehicle, and having another passage connecting the vacuum sources on both vehicles, a rotatable valve member in the casing intersecting said passages for closing the passages when the valve member is rotated, said valve member having a right-angle turn, and a hose connection connected to the outer end of the right-angle turn and to the other vehicle, and completing the line connecting the control valve to the brakes of the following vehicle, said valve member being rotated to a closed position by the hose connection when the same is taut.

8. In a brake apparatus of the class described for connected vehicles, a casing connected to one of said vehicles and having a fluid passage therein, a valve member rotatably mounted in the casing intersecting the passage and positioned transversely to the longitudinal direction of the vehicle and having a right-angle turn at its outer end and a passage through said right-angle turn, the latter passage being normally connected with the passage in the casing, and a hose connection connecting the outer end of the right-angle turn to the other vehicle, said valve member, when said hose connection is under tension, being rotated to disconnect the passage in the valve member from the passage in the casing.

9. In a brake apparatus of the class described for connected vehicles, a casing conneced to one of said vehicles and having a fluid passage therein, a valve member rotatably mounted in the casing intersecting the passage and positioned transversely to the longitudinal direction of the vehicle and having a right-angle turn at its outer end and a passage through the valve member, the latter passage being normally connected with the passage in the casing, and a hose connection connecting the outer end of the right-angle turn to the other vehicle, said valve member, when said hose connection is under tension, being rotated to disconnect the passage in the valve member from the passage in the casing, said casing having another passage intersected by said valve member and also adapted to be closed when the valve member is rotated by and when the hose connection is under tension.

10. In a brake apparatus of the class described for connected vehicles, the combination with a vacuum source on the leading vehicle and on the following vehicle, brakes on both vehicles, means on the leading vehicle for controlling the brakes on both vehicles, and means on the following vehicle for emergency application of the brakes on the following vehicle, of a coupling on one of the vehicles, comprising a casing having a passage for connecting the vacuum source on the leading vehicle to the brakes on the following vehicle, and having another passage connecting the vacuum sources on both vehicles, a rotatable valve member in the casing intersecting said passages for closing the passages when the valve member is rotated, said valve member having a right-angle turn, and a hose connection connected to the outer end of the right-angle turn and to the other vehicle, said valve member being rotated to a closed position by the hose connection when the same is taut.

11. In a brake apparatus for connected vehicles, a preselector valve, comprising a casing connected to a source of fluid pressure, and to separate brake lines, a rotatable spindle in the casing, and separate valve members adapted to cover the separate brake lines and adjustably secured with the respect to each other to said spindle for consecutively opening and closing the connection between the fluid source and the brake lines.

12. In a brake apparatus for connected vehicles, a preselector valve, comprising a casing connected to a source of fluid pressure, and to separate brake lines, a rotatable spindle in the casing, separate valve members adapted to cover the separate brake lines and adjustably secured with the respect to each other to said spindle for consecutively opening and closing the connection between the fluid source and the brake lines, and means at the outside of the casing for adjusting the valve members with respect to each other.

THEODORE A. STEHLIN.